(12) United States Patent
Xie

(10) Patent No.: US 12,341,363 B2
(45) Date of Patent: Jun. 24, 2025

(54) METHOD FOR GENERATING A POLYPHASE ALTERNATING CURRENT, CIRCUIT ARRANGEMENT AND ENERGY SUPPLY SYSTEM

(71) Applicant: SAX Power GmbH, Erbach (DE)

(72) Inventor: Anya Xie, Ulm (DE)

(73) Assignee: SAX Power GmbH, Erbach (DE)

( * ) Notice: Subject to any disclaimer, the term of this patent is extended or adjusted under 35 U.S.C. 154(b) by 0 days.

(21) Appl. No.: 18/657,121

(22) Filed: May 7, 2024

(65) Prior Publication Data
US 2024/0380220 A1    Nov. 14, 2024

(30) Foreign Application Priority Data

May 12, 2023    (DE) ..................... 10 2023 112 571.0
May 12, 2023    (EP) ..................... 23173056

(51) Int. Cl.
*H02J 7/00* (2006.01)
*H01M 10/42* (2006.01)
(Continued)

(52) U.S. Cl.
CPC ......... *H02J 7/0014* (2013.01); *H01M 10/425* (2013.01); *H01M 10/441* (2013.01);
(Continued)

(58) Field of Classification Search
CPC .................................................. H02J 7/0014
(Continued)

(56) References Cited

U.S. PATENT DOCUMENTS 6,137,704 A * 10/2000 Ito .......................... H02M 5/458
                                                                    363/132
2008/0252266 A1* 10/2008 Bolz ..................... H02J 7/0016
                                                                    320/166

(Continued)

FOREIGN PATENT DOCUMENTS

AT            346422 B    11/1978
CN       114447970 A     5/2022
(Continued)

OTHER PUBLICATIONS

J. Qi, D. Lu., "Review of Battery Cell Balancing Techniques", Australasian Universities Power Engineering Conference, AUPEC 2014, Curtin University, Perth, Australia, Sep. 28 Oct. 1, 2014—Abstract only available.

*Primary Examiner* — Yalkew Fantu
(74) *Attorney, Agent, or Firm* — Dickinson Wright PLLC

(57) ABSTRACT

A method for generating a polyphase alternating current by interconnecting a plurality of DC voltage sources, having at least the following method steps:

providing a configurable DC voltage string for each phase (L1, L2, L3) of the polyphase alternating current, wherein each configurable DC voltage string is formed from a plurality of the DC voltage sources which can be interconnected in a configurable series circuit;

arranging the configurable DC voltage strings in a polygon circuit, in particular in a delta circuit;

providing a neutral grounding transformer for the purpose of achieving a common neutral point (N) of all configurable DC voltage strings; and configuring the configurable DC voltage strings such that the polyphase alternating current is provided and a zero
(Continued)

phase-sequence system current is also formed for charge equalization between the configurable DC voltage strings.

15 Claims, 4 Drawing Sheets

(51) Int. Cl.
*H01M 10/44* (2006.01)
*H02J 1/08* (2006.01)
*H02M 1/00* (2006.01)
*H02M 7/5387* (2007.01)

(52) U.S. Cl.
CPC .............. *H02J 1/08* (2013.01); *H02J 7/0063* (2013.01); *H02M 1/007* (2021.05); *H02M 7/53871* (2013.01); *H01M 2010/4271* (2013.01); *H02J 2207/20* (2020.01)

(58) Field of Classification Search
USPC .......................................................... 320/116
See application file for complete search history.

(56) References Cited

U.S. PATENT DOCUMENTS

| | | | |
|---|---|---|---|
| 2021/0126550 A1* | 4/2021 | Yenduri | H02M 5/4585 |
| 2021/0384729 A1* | 12/2021 | Thomas, III | H02J 7/00714 |

FOREIGN PATENT DOCUMENTS

| | | |
|---|---|---|
| DE | 102011004248 A1 | 8/2011 |
| DE | 102011086545 A1 | 5/2013 |
| DE | 102018003642 A1 | 11/2019 |
| WO | 2015188877 A1 | 12/2015 |
| WO | 2019081503 A1 | 5/2019 |
| WO | 2022270818 A1 | 12/2022 |

* cited by examiner

METHOD FOR GENERATING A POLYPHASE ALTERNATING CURRENT, CIRCUIT ARRANGEMENT AND ENERGY SUPPLY SYSTEM

CROSS-REFERENCE TO RELATED APPLICATION

This application claims the benefit and priority of European Patent Appl. No. 23 173 056.5, filed on May 12, 2023, and German Patent Application No. DE 10 2023 112 571.0 filed on May 12, 2023. The entire disclosures of the above applications are incorporated herein by reference.

BACKGROUND OF THE INVENTION

The invention relates to a method for generating a polyphase alternating current, in particular a three-phase alternating current, by interconnecting a plurality of DC voltage sources. The invention also relates to a computer program for carrying out the method.

The invention also relates to a circuit arrangement for generating a polyphase alternating current, in particular a three-phase alternating current, from a plurality of DC voltage sources, comprising a configurable DC voltage string for each phase of the polyphase alternating current, wherein each configurable DC voltage string is configured to interconnect a plurality of DC voltage sources, which can be connected to the configurable DC voltage string, in a configurable series circuit.

The invention further relates to an energy supply system having a circuit arrangement for generating a polyphase alternating current and a plurality of DC voltage sources.

Battery storage systems are sometimes used in energy supply systems, such as photovoltaic home storage devices ("solar batteries") for storing surplus yield from photovoltaic systems or drive batteries ("high-voltage storage devices") for supplying the electric motors or drive units of electric vehicles. Such battery storage systems sometimes require battery voltages of several hundred volts. However, since the cell voltage of a single battery cell is only a few volts (e.g. 3.7 V for a lithium-ion battery), many individual battery cells need to be connected in series to form a battery pack or rechargeable battery pack (also referred to in a simplified form as "battery" below).

Due to manufacturing, each battery cell of a battery has differences in its properties, such as the cell capacity, the self-discharge rate and the temperature characteristics. Over time, these differences are additionally intensified by aging effects. As a result, some battery cells have not yet reached their maximum charge level during the charging process, while other battery cells are already fully charged. Overcharging the already fully charged battery cells can eventually lead to their damage and even destruction. To prevent this, the charging process must be aborted prematurely.

The discharging process is similar. While some battery cells are already completely discharged, other battery cells sometimes still store enough energy to continue to drive an electric vehicle, for example. In the example of the electric vehicle, the driving operation would ultimately have to be aborted prematurely, since otherwise the weaker battery cells would be deeply discharged, which—as in the case of overcharging—can lead to their destruction.

To ensure a smooth charging and discharging process, battery management systems ("BMS") are used to equalize the charge between the individual battery cells, cf. J. Qi, D. Lu., "Review of Battery Cell Balancing Techniques", Australasian Universities Power Engineering Conference, AUPEC 2014, Curtin University, Perth, Australia, 28 Sep.-1 Oct. 2014.

The most common method on the filing date is so-called passive charge equalization. In this case, already fully charged battery cells are discharged again via a resistor, while the other battery cells are charged further. An obvious disadvantage of this method is that valuable electrical energy is lost in this case and that the method also does not provide a solution for the discharge process.

Passive charge equalization problems can be resolved with the aid of active charge equalization. However, this technology requires complex circuits with power electronic components and complicated open-loop control. For example, inductive equalization circuits may require two metal oxide semiconductor field-effect transistors (MOSFET) per battery cell; capacitive equalization circuits may typically even require four. Inductors, transformers or capacitors are also required as energy storage devices.

Self-commutated inverters are often used to generate three-phase voltages, e.g. for the electrical machines or electric motors in an electric vehicle. Typically, such an inverter consists of six power electronic valves that are interconnected to form a three-phase bridge. In this "two-point inverter", the sinusoidal AC voltages are generated from pulsed voltages with three voltage levels (0, $\pm U_{DC}$). The level of the voltage pulses depends on the battery voltage $U_{DC}$ and is therefore constant. To generate AC voltages, the time duration of the voltage pulses can be varied as an actuator. It is usually calculated using the pulse width modulation (PWM) method. In this case, however, high interference voltages are found in the AC voltages at the superimposed frequencies. In order to reduce the voltage harmonics, it is known to increase the clock frequencies of the inverter. As a rule, the clock frequencies of a modern converter are therefore in the range of several kHz up to 100 KHz. However, the switching losses of the inverters increase in proportion to their clock frequency.

To avoid these problems, a modular inverter can be used, as suggested in DE 10 2011 004 248 A1, for example. With this technology, the individual battery cells are not connected in series directly, but via power electronic H-bridge circuits in order to increase the number of voltage levels. In this way, the clock frequencies and thus the switching losses of the inverter can be reduced for the specified voltage quality. Thus, the single-phase sinusoidal output voltage is not generated here by pulsed voltages, but by voltages in a staircase pattern with small steps. In such a "multi-level inverter", the level of the lowest voltage level usually corresponds to the cell voltage of the battery used (e.g. 3.7 V).

Since the individual battery cells can each be connected via a separate H-bridge, charge equalization of the battery cells is possible. If individual battery cells fail, the inverter with the "healthy" cells can continue to be operated safely. Defective battery cells can be switched off and bypassed and can therefore be safely replaced. The availability is thus significantly higher than with a direct series connection of the battery cells.

The described circuit basically represents a combination of a multi-level inverter, active charge equalization and distributed battery management. It is also advantageous for safety that only one battery cell can be short-circuited in the event of a fault in the circuit. The residual current and the energy released are significantly lower than with a conventional series connection. In addition, only the voltage of a single battery cell is present after the inverter has been switched off. This makes maintenance work much easier. Battery cells of different ages and types can be used in the same battery block. This makes it possible to replace defective battery cells and thus significantly increases the useful life of a battery block.

The principle described may be suitable for single-phase loads, and even for three-phase loads. A three-phase modular inverter can be implemented, for example, from three modularly configurable DC voltage strings or multi-level inverters interconnected in a star circuit, as described in DE 10 2011 086 545 A1.

However, the main advantage of the active charge equalization of modular inverter technology can only be used only to a limited extent in this circuit. This is because direct charge equalization between the battery cells in the different phases is not possible. The charge equalization between the individual phases can only be influenced by different active powers of the three phases. The resulting excess or deficit power in the individual phases would have to be compensated for by the supply network. However, such supply-network-based charge equalization is not permitted by the standards of many countries and is not possible at all in the case of island operation, i.e. entirely without a supply network.

SUMMARY OF THE INVENTION

In view of the known prior art, the object of the present invention is to provide a method for generating a polyphase alternating current, in particular a three-phase alternating current, by interconnecting a plurality of DC voltage sources, with improved charge equalization between the DC voltage sources.

The present invention is also based on the object of providing an advantageous computer program for carrying out such a method.

In addition, the object of the invention is to provide a circuit arrangement for generating a polyphase alternating current, in particular a three-phase alternating current, from a plurality of DC voltage sources, with improved charge equalization between the DC voltage sources.

It is also an object of the invention to provide a polyphase energy supply system based on a plurality of DC voltage sources, with improved charge equalization between the DC voltage sources.

The object is achieved, for the method, with the features specified in claim 1. With regard to the computer program, the object is achieved by the features of claim 8. With regard to the circuit arrangement, the object is achieved by claim 9 and, for the energy supply system, by claim 14.

The dependent claims and the features described below concern advantageous embodiments and variants of the invention.

A method for generating a polyphase alternating current by interconnecting a plurality of DC voltage sources is provided.

The polyphase alternating current to be generated can preferably be a three-phase alternating current or "three-phase current". Basically, however, any number of phases can be provided, for example only two phases or more than three phases, for example four phases or five phases. The invention is primarily described below by means of a three-phase alternating current, which, however, should be understood only as an example and not as a restriction.

The phases of the polyphase alternating current can be set together or individually in terms of amplitude, phase and/or frequency.

The DC voltage source may be in particular a single battery cell of a battery or a group ("battery module") of a plurality of interconnected battery cells of a battery. However, the DC voltage source may possibly also be a complete battery or a group of a plurality of batteries.

In the present case, a "battery" can be understood as meaning both a rechargeable storage device (i.e. a "rechargeable battery"/"rechargeable battery pack"), the individual cells of which are also called "secondary cells", and a non-rechargeable storage device. A battery or battery pack may possibly also have only a single battery cell. The present invention therefore should not necessarily be understood as being limited to batteries having a plurality of interconnected battery cells. In addition, in the context of the present description, a battery can also be used to mean a storage device for electrical energy that is not or is not exclusively created electrochemically, i.e. a capacitor, for example.

Basically, however, the DC voltage source can be any DC voltage source, that is to say, for example, also a DC voltage provided by an electronic assembly, for example a DC voltage provided by a rectifier and/or DC-DC converter on the output side. In particular, the DC voltage source can also be a DC voltage energy source such as a solar cell or a photovoltaic cell. The DC voltage sources are sometimes referred to below and above for simplification as battery cells of a common battery, which, however, should not be understood as a restriction but only as an example.

In the context of the method, the invention provides for a configurable DC voltage string to be provided for each phase of the polyphase alternating current. Each configurable DC voltage string is formed from a plurality of DC voltage sources which can be interconnected in a configurable series circuit. The configurable DC voltage strings are configured (for example by a common open-loop control device or by respective open-loop control devices) such that the desired polyphase alternating current is provided.

The invention provides for the configurable DC voltage strings to be arranged in a polygon circuit. This can be a delta circuit in particular, insofar as three-phase alternating current is to be provided.

The polyphase alternating current can thus be provided by a number of individual configurable DC voltage strings corresponding to the number of phases provided, which DC voltage strings each generate only a single-phase alternating current in isolation.

In contrast to the star circuit that is otherwise conventional in modular inverters, the proposed polygon circuit allows an equalization current to be formed in the three phases for charge equalization between the individual phases. This equalization current is referred to as "zero phase-sequence system current" below. The polygon circuit (i.e. a delta circuit in the case of a three-phase alternating current, for example) can ensure that the circuit cannot supply a zero phase-sequence system current to the outside, i.e. in the intended load currents. The equalization current or zero phase-sequence system current is therefore not noticeable in the consumer/customer network. The charge equalization between the individual phases, i.e. between the individual configurable DC voltage strings in the present case, can thus be realized without influencing an external supply network and thus even in a pure island network.

The invention therefore provides for the configurable DC voltage strings to be configured (for example by the common open-loop control device or the respective open-loop control devices) such that the zero phase-sequence system current for the charge equalization between the configurable DC voltage strings is formed.

This means that charge equalization can be performed with maximum flexibility between all the DC voltage sources involved-regardless of the phase or the DC voltage string in which the DC voltage sources are located.

The invention further provides for a neutral grounding transformer to be provided for the purpose of achieving a common neutral point of all configurable DC voltage strings.

Since the polygon circuit proposed above (e.g. delta circuit) has no neutral point and therefore cannot be loaded in a single phase, it is proposed to provide a separate neutral grounding transformer.

Thus, modular inverter technology with all the main advantages can be used and can provide comprehensive and direct charge equalization between the individual phases, combined with the possibility of single-phase loading of the power supply system provided.

For charge equalization between the DC voltage sources (in particular also between the DC voltage sources of the same phase), it can be provided that charge differences of the DC voltage sources are detected and the detected charge differences are taken into account when interconnecting the DC voltage sources for carrying out charge equalization.

Preferably, the charge equalization (in particular the charge equalization of DC voltage sources within the same phase) can be effected by influencing the loading duration of the respective DC voltage sources when generating the AC voltage. This means that DC voltage sources with a higher residual charge are subjected to loads for longer than DC voltage sources with a lower residual charge. The duration of the current conduction by the DC voltage sources is therefore preferably used as an open-loop control parameter for charge equalization. For example, this method can be referred to as "Rotating Balancing". In principle, however, passive charge equalization or active charge equalization may also be provided, inter alia, within the scope of the invention (in particular in the charge equalization between the individual phases).

For detecting the charge differences, it is possible to use corresponding sensor units which detect, for example, voltages and/or currents of the individual DC voltage sources, of a group of DC voltage sources and/or of the DC voltage sources of a common DC voltage string or a common phase.

Preferably, the interconnection of the DC voltage sources for generating the AC voltage is defined or modified with regard to the charge equalization.

The charge equalization between the individual phases can be achieved, for example, by the least charged phase receiving charge from the other (two) phases or by the highest charged phase supplying charge to the other (two) phases.

In one advantageous configuration of the invention, it may be provided that the AC voltage or the polyphase alternating current is preferably generated by a staircase-shaped approximation.

The AC voltage in the individual phases can be generated by summed individual voltages of the individual DC voltage sources of the common DC voltage string, said individual voltages being in a staircase pattern with small steps. The level of the lowest voltage level can correspond to the output voltage of the respective DC voltage source (e.g. the cell voltage of a battery cell, such as 3.7 V). In this way, the otherwise normally required, high clock frequencies of a pulse-width-modulated output voltage and the associated switching losses can be greatly reduced.

The described principle is particularly advantageously suitable in the context of a configurable series circuit, since the series circuit can be conveniently and flexibly adapted with regard to charge equalization. However, this does not exclude, for example, the fact that, in the context of the invention, DC voltage sources are also optionally interconnected with fixed wiring, for example in a series and/or parallel circuit. For example, battery modules can be formed from two, three, four, five, six, seven, eight, nine, ten or even more permanently interconnected battery cells which can then in turn be interconnected in a configurable manner with further battery modules or battery cells. Fixed wiring of DC voltage sources or battery cells can be effected, for example, by means of busbars or other suitable electrical conductors.

In one advantageous development of the invention, it can be provided that a symmetrical three-phase alternating current is provided by appropriately configuring the interconnection of the individual DC voltage sources of the respective configurable DC voltage strings, with preferably the following relationships between the AC voltages of the individual phases: $u_{L1}(t)=\hat{U}\cdot\cos(2\cdot\pi\cdot f\cdot t)$; $u_{L2}(t)=\hat{U}\cdot\cos(2\cdot\pi\cdot f\cdot t-120°)$ and $u_{L3}(t)=\hat{U}\cdot\cos(2\cdot\pi\cdot f\cdot t-240°)$, with the peak value U and the network frequency f.

If desired, comparable relationships can also be readily established by a person skilled in the art for a polyphase alternating current with only two phases or more than three phases.

For example, the peak value of the AC voltage can be 566 volts for a 400 volt three-phase network, with a network frequency of 50 Hz (e.g. for an application in Germany).

According to one development of the invention, it can be provided that the zero phase-sequence system current in each of the configurable DC voltage strings is identical in terms of amplitude and phase position.

In particular, it can be provided that, by appropriately configuring the interconnection of the individual DC voltage sources of the respective configurable DC voltage strings for the formation of the zero phase-sequence system current, a zero phase-sequence system voltage according to $u_0(t)=\hat{U}_0\cdot\cos(2\cdot\pi\cdot f\cdot t+\varphi_0)$ is respectively added to the AC voltages of the individual phases, with the amplitude $\hat{U}_0$ and the phase angle $\varphi_0$ of the zero phase-sequence system voltage.

Therefore, the following definitions may apply to the individual AC voltages, taking into account the zero phase-sequence system current:

$$u_{L1}(t) = \hat{U}\cdot\cos(2\cdot\pi\cdot f\cdot t) + \hat{U}_0\cdot\cos(2\cdot\pi\cdot f\cdot t + \varphi_0),$$

$$u_{L2}(t) = \hat{U}\cdot\cos(2\cdot\pi\cdot f\cdot t - 120°) + \hat{U}_0\cdot\cos(2\cdot\pi\cdot f\cdot t + \varphi_0)$$

and $$u_{L3}(t) = \hat{U}\cdot\cos(2\cdot\pi\cdot f\cdot t - 240°) + \hat{U}_0\cdot\cos(2\cdot\pi\cdot f\cdot t + \varphi_0).$$

Alternatively, the individual AC voltages, taking into account the relationship $\hat{U}_0\cdot\cos(2\cdot\pi\cdot f\cdot t+\varphi_0)=\hat{U}_{d0}\cdot\cos(2\cdot\pi\cdot f\cdot t)+\hat{U}_{q0}\cdot\sin(2\cdot\pi\cdot f\cdot t)$, with $\hat{U}_{d0}$ as the d component and $\hat{U}_{q0}$ as the q component of the zero phase-sequence system voltage, can also be determined as:

$$u_{L1}(t) = \hat{U} \cdot \cos(2 \cdot \pi \cdot f \cdot t) + \hat{U}_{d0} \cdot \cos(2 \cdot \pi \cdot f \cdot t) + \hat{U}_{q0} \cdot \sin(2 \cdot \pi \cdot f \cdot t),$$

$$u_{L2}(t) = \hat{U} \cdot \cos(2 \cdot \pi \cdot f \cdot t - 120°) + \hat{U}_{d0} \cdot \cos(2 \cdot \pi \cdot f \cdot t) + \hat{U}_{q0} \cdot \sin(2 \cdot \pi \cdot f \cdot t)$$

and $$u_{L3}(t) = \hat{U} \cdot \cos(2 \cdot \pi \cdot f \cdot t - 240°) + \hat{U}_{d0} \cdot \cos(2 \cdot \pi \cdot f \cdot t) + \hat{U}_{q0} \cdot \sin(2 \cdot \pi \cdot f \cdot t).$$

The d and q components have a phase shift of 90° with respect to each other and are orthogonal (perpendicular) to each other as phasors. The d component may be in phase with one of the mixed system voltages (above with $u_{L1}(t)$, for example, i.e. phase L1).

The additional voltage component or the zero phase-sequence system voltage $u_0(t)$ can be used to generate a zero phase-sequence system current $\underline{I}_0 = \underline{I}_{d0} + \underline{I}_{q0}$ with a certain RMS value $I_0$ and phase angle $\varphi_{I0}$, wherein $\underline{I}_0$ can be broken down into a d component $\underline{I}_{d0}$ and a q component $\underline{I}_{q0}$. As with the voltages, the two current components $\underline{I}_{d0}$ and $\underline{I}_{q0}$ are also orthogonal as phasors and have a phase shift of 90° with respect to each other. In the present example, the d component is in phase with the positive phase-sequence system voltage $u_{L1}(t)$ of phase L1. The following relationships therefore apply:

$$i_{L1p}(t) = I \cdot \cos(2 \cdot \pi \cdot f \cdot t + \varphi_I) + I_{d0} \cdot \cos(2 \cdot \pi \cdot f \cdot t) + I_{q0} \cdot \sin(2 \cdot \pi \cdot f \cdot t),$$

$$i_{L2p}(t) =$$
$$I \cdot \cos(2 \cdot \pi \cdot f \cdot t + \varphi_I - 120°) + I_{d0} \cdot \cos(2 \cdot \pi \cdot f \cdot t) + I_{q0} \cdot \sin(2 \cdot \pi \cdot f \cdot t)$$

and $$i_{L3p}(t) =$$
$$I \cdot \cos(2 \cdot \pi \cdot f \cdot t + \varphi_I - 240°) + I_{d0} \cdot \cos(2 \cdot \pi \cdot f \cdot t) + I_{q0} \cdot \sin(2 \cdot \pi \cdot f \cdot t),$$

with I as the amplitude and $\varphi_1$ as the phase angle of the positive phase-sequence system current of the phases.

In one development of the invention, it may be provided that one or more closed-loop control methods are used to determine the zero phase-sequence system current.

The zero phase-sequence system voltage can be used as the manipulated variable for the closed-loop control, a target value of the zero phase-sequence system current can be used as the reference variable and the captured actual value of the zero phase-sequence system current can be used as the closed-loop control variable.

In one development of the invention, it may be provided that a q component of the zero phase-sequence system current is minimized. Preferably, the target value of the q component is zero or the q component is controlled to zero in a closed-loop manner.

This makes it possible to minimize losses caused by the charge equalization. Preferably, no reactive power is provided in the zero phase-sequence system (reactive power=zero).

In one advantageous development of the invention, it can be provided that a target value of a d component of the zero phase-sequence system current is determined taking into account a charge difference between the DC voltage sources of the DC voltage strings.

Preferably, the target value of the d component of the zero phase-sequence system current is determined according to a proportional relationship to the charge difference between the DC voltage sources of the DC voltage strings.

The d component of the zero phase-sequence system current can be advantageously controlled in a closed-loop manner to a value determined according to the level of the charge differences, e.g. 1 A for a charge difference of 1%.

At this point, it should be stressed that the aforementioned method steps do not necessarily have to be carried out in the order in which they are first described or mentioned in the description or in the claims. For example, individual method steps or groups of method steps can therefore be interchangeable if this is not technically excluded. Method steps can also be combined with each other, divided into separate intermediate steps or supplemented with intermediate steps. The method is also not necessarily conclusively described with the listed method steps and can be supplemented with further method steps, also not mentioned.

The invention also relates to a computer program comprising control instructions which, when the program is executed by an open-loop control device, cause this to carry out the method according to the embodiments above and below.

The open-loop control device may be designed as a microprocessor. Instead of a microprocessor, any other device for implementing the open-loop control device may also be provided, for example one or more arrangements of discrete electrical components on a printed circuit board, a programmable logic controller (PLC), an application-specific integrated circuit (ASIC) or another programmable circuit, for example also a field programmable gate array (FPGA), a programmable logic arrangement (PLA) and/or a commercially available computer. The open-loop control device may also result as a combination of a plurality of electronic components arranged in a distributed manner decentrally within the circuit arrangement also mentioned below.

The open-loop control device may also be a functional module of a higher-level open-loop control unit, for example a functional module of a battery management system of the DC voltage sources or an open-loop control unit of the energy supply system (for example of a vehicle) also mentioned below.

The invention also relates to a circuit arrangement for generating a polyphase alternating current, in particular a three-phase alternating current, from a plurality of DC voltage sources. The circuit arrangement has a configurable DC voltage string for each phase of the polyphase alternating current, wherein each configurable DC voltage string is configured to interconnect a plurality of DC voltage sources, which can be connected to the configurable DC voltage string, in a configurable series circuit, and wherein the configurable DC voltage strings are arranged in a polygon circuit, in particular in a delta circuit. The circuit arrangement further has a neutral grounding transformer for achieving a common neutral point of all configurable DC voltage strings, and an open-loop control device which is configured to configure the configurable DC voltage strings such that the polyphase alternating current is provided and a zero phase-sequence system current is also formed for charge equalization between the configurable DC voltage strings.

The at least one DC voltage source should preferably not be understood as meaning a component of the circuit arrangement.

The proposed new circuit arrangement is very particularly suitable for three-phase modular inverters with batteries as energy storage devices. The particular advantage of the proposed circuit arrangement is the possibility of cross-phase charge equalization and the simultaneous possibility of a single-phase load by separately forming the neutral point which can be loaded by the load in a normal manner.

In one development of the invention, it can be provided that each of the configurable DC voltage strings has an output-side interface for providing the generated AC voltage, and a cascade of a plurality of inverter units which together can provide the AC voltage at the output-side interface.

Each of the inverter units is preferably configured to include at least one DC voltage source, which can be connected to the respective inverter unit, in the generation of the AC voltage or to exclude it from the generation of the AC voltage.

The connection between the inverter units and the DC voltage sources can be effected, for example, via appropriate supply lines and/or busbars.

Inverters based on a cascade of a plurality of inverter units are also called "modular inverters". With this technology, the individual DC voltage sources are not connected in series directly, but rather via the individual inverter units, for example the power electronic H-bridges also mentioned below.

Since the individual DC voltage sources can each be switched on or off via a separate inverter unit, charge equalization between the DC voltage sources, i.e. between a plurality of battery cells, for example, is possible. In the event of a failure of DC voltage sources, the inverter can also continue to be operated with the DC voltage sources that are still ready for operation. The availability of the energy supply system can thus be much higher than with the conventional technique of a direct series connection of the DC voltage sources. Defective DC voltage sources, such as defective battery cells, can be switched off and bypassed. Not least, this also makes it possible to safely replace these DC voltage sources even during operation.

In an advantageous way, DC voltage sources of different ages or states and different types can be used in the same energy supply system. This can significantly extend the useful life of a battery block, for example.

In one advantageous development of the invention, it can be provided that the inverter units each have an H-bridge circuit consisting of four configurable power electronic switching elements.

Such H-bridge circuits are basically known (cf. also "cascaded H-bridge"). For example, reference should be made in this regard to DE 10 2018 003 642 A1, the disclosure content of which is fully incorporated in the present description by this reference. The invention is particularly advantageously suitable for use with inverters based on cascaded H-bridges. This is because in this way the interconnection of the DC voltage sources can be advantageously adapted with regard to the charge equalization.

For example, two of the aforementioned power electronic switching elements can each be connected by their outputs to form a series circuit and can each form a common connecting branch of the H-bridge circuit. Two such connecting branches may be provided. In both connecting branches, one output of the inverter unit can be respectively connected between the power electronic switching elements. The respective ends of the connecting branches can be connected to each other, with an input of the inverter unit connected at each end; the two connecting branches can thus be connected in parallel.

It may be provided that the configurable power electronic switching elements are designed as bipolar transistors or preferably as MOSFETs. In principle, however, any switching elements, in particular semiconductor components, can be used. The configurable power electronic switching elements can also be designed as relays. The design of the configurable power electronic switching elements basically does not limit the invention.

The power electronic switching elements can be configured, for example, by the aforementioned open-loop control device and/or the open-loop control module. It may be provided that the open-loop control device is configured to either include individual DC voltage sources in the generation of the AC voltage, depending on the status information transmitted by the open-loop control module to this DC voltage source, or to at least temporarily exclude them.

The DC voltage sources can be temporarily excluded, especially during charge equalization or for other reasons. For example, provision may also be made for faulty or overheated DC voltage sources to be excluded in the longer term. In particular, deep-discharged battery cells can also be excluded in the longer term.

In one advantageous development of the invention, it can be provided that the neutral grounding transformer has a transformer.

The transformer may have, for example, a star-delta circuit, a zigzag circuit or other suitable interconnection to form a neutral point.

In one advantageous development of the invention, it can be provided that the neutral grounding transformer is designed for a maximum load that is less than 10 KW, preferably less than 8 KW, particularly preferably less than 5 kW.

It may be sufficient to dimension the neutral grounding transformer (i.e. the transformer, for example) only for a limited power limit value. The technical and economic requirements for the provision of the neutral grounding transformer can be adapted, for example, to the standards prevailing in the respective country or to the intended application. For example, the sum of all single-phase loads in a customer network must generally not exceed a certain limit value anyway—in Germany, for example, 4.6 KW and in Austria, for example, 3.7 kW.

The dimensioning of the neutral grounding transformer with regard to such limit values, i.e. for example the limit values 4.6 KW or 3.7 kW, can be particularly advantageous if the nominal powers of the DC voltage sources or energy storage devices are far above these limits.

The invention also relates to an energy supply system having a circuit arrangement according to the embodiments above and below and the DC voltage sources. The DC voltage sources are connected to the corresponding configurable DC voltage strings.

In the proposed energy supply system, the DC voltage sources in respective DC voltage strings can thus be divided among the individual phases in a delta circuit. For example, a transformer in a star-delta circuit or a zigzag circuit can be used to realize the "missing" neutral point. Thus, the three-phase loads (i.e. the current components in the so-called positive phase-sequence system and negative phase-sequence system) are automatically taken over by the DC voltage sources (i.e., for example, by an energy storage device that contains the DC voltage sources). The single-phase load (i.e. the current in the so-called zero phase-sequence system) can be automatically taken over by the neutral grounding transformer or transformer, since this current component can flow via the neutral grounding transformer and its neutral point.

A particularly advantageous application of the proposed energy supply system concerns the electrical supply of electrical loads of an electric vehicle, in particular an electric car.

In one development of the invention, it may be provided that the DC voltage sources are designed as battery cells of a battery.

The invention also relates to an electrical load arrangement, in particular an electric vehicle, having an energy supply system according to the embodiments above and below and at least one electrical load.

One load or a plurality of loads can be connectable or connected to an output-side interface of the energy supply system. The load can be any electrical load through to a group of a plurality of electrical loads. Preferably, the load is an electric motor, a drive unit and/or at least one electrical load within a low-voltage network (in particular a household power supply system).

In principle, the electrical load arrangement can be any load arrangement which has at least one electrical load. For example, the load arrangement can be an electrical machine tool through to a building to be supplied with electrical energy.

Particularly preferably, the electrical load arrangement is an electric vehicle. The term "electric vehicle" describes any electrically operated means of transport, in particular vehicles for use on land, on water or in the air, including spacecraft. Preferably, however, the electric vehicle or the load arrangement is an electric car.

However, the invention is also particularly suitable for the electrical supply of households or industrial plants.

Features which have been described in connection with one of the subjects of the invention, specifically given by the method according to the invention, the circuit arrangement according to the invention, the energy supply system according to the invention, the load arrangement according to the invention and the computer program according to the invention, are also advantageously implementable for the other subjects of the invention. Likewise, advantages specified in connection with one of the subjects of the invention can also be understood in relation to the other subjects of the invention.

In addition, it should be noted that expressions such as "comprising", "having" or "with" do not exclude any other features or steps. Furthermore, expressions such as "a" or "the" that refer in the singular to steps or features do not exclude a plurality of features or steps—and vice versa.

In a puristic embodiment of the invention, it may however also be provided that the features introduced in the invention by the expressions "comprising", "having" or "with" constitute an exhaustive list. Accordingly, in the context of the invention, one or more lists of features can be considered in self-contained form, for example respectively for each claim. By way of example, the invention can consist exclusively of the features specified in claim 1.

Note that terms such as "first" or "second" etc. are used predominantly for the sake of distinguishability between respective device or method features, and are not imperatively intended to indicate that features are mutually dependent or relate to one another.

At this point, it should be noted that the expression "connected" or "connection" used in the present description and in the claims may describe a direct electrical connection of said components, but also an indirect electrical connection of said components (i.e., for example, via further electrical lines or electronic components such as resistors, inductances and/or capacitances, etc.). The term "attached", on the other hand, usually indicates a direct connection of said components.

Furthermore, it should be stressed that the values and parameters described in the present case also encompass deviations or fluctuations of ±10% or less, preferably ±5% or less, more preferably ±1% or less, and very particularly preferably ±0.1% or less, of the respectively stated value or parameter, provided that these deviations are not excluded in practice when implementing the invention. The specification of ranges by way of start and end values also encompasses all values and fractions encompassed by the respectively stated range, in particular the start and end values and a respective mean value.

BRIEF DESCRIPTION OF THE DRAWINGS

Exemplary embodiments of the invention will be described in more detail below with reference to the drawings.

The figures each show preferred exemplary embodiments in which individual features of the present invention are illustrated in combination with one another. Features of one exemplary embodiment may also be implemented separately from the other features of the same exemplary embodiment, and may accordingly be readily combined by a person skilled in the art to form further useful combinations and sub-combinations with features of other exemplary embodiments.

Elements of identical function are denoted by the same reference signs in the figures.

Figure 1:
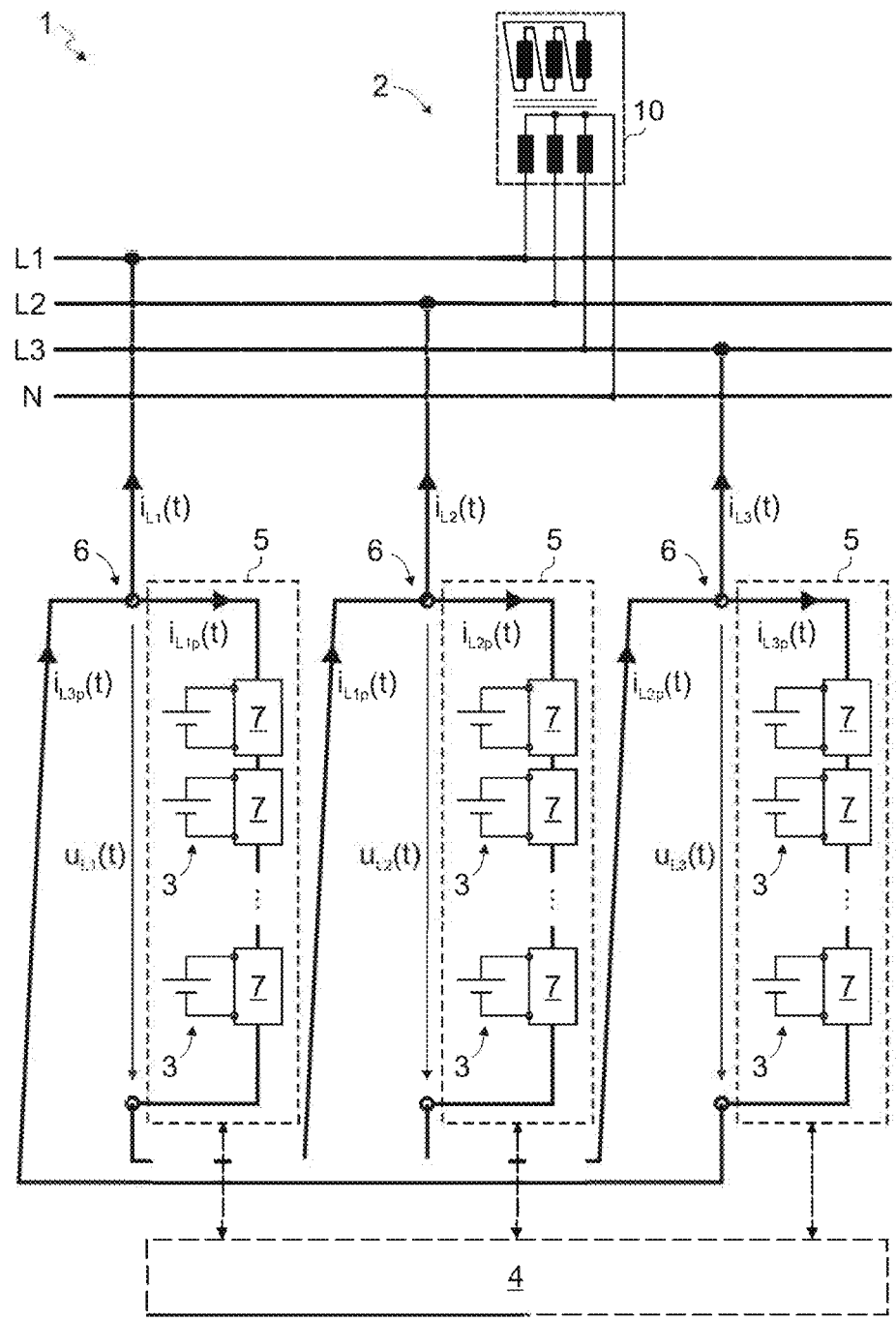
Figure 2:
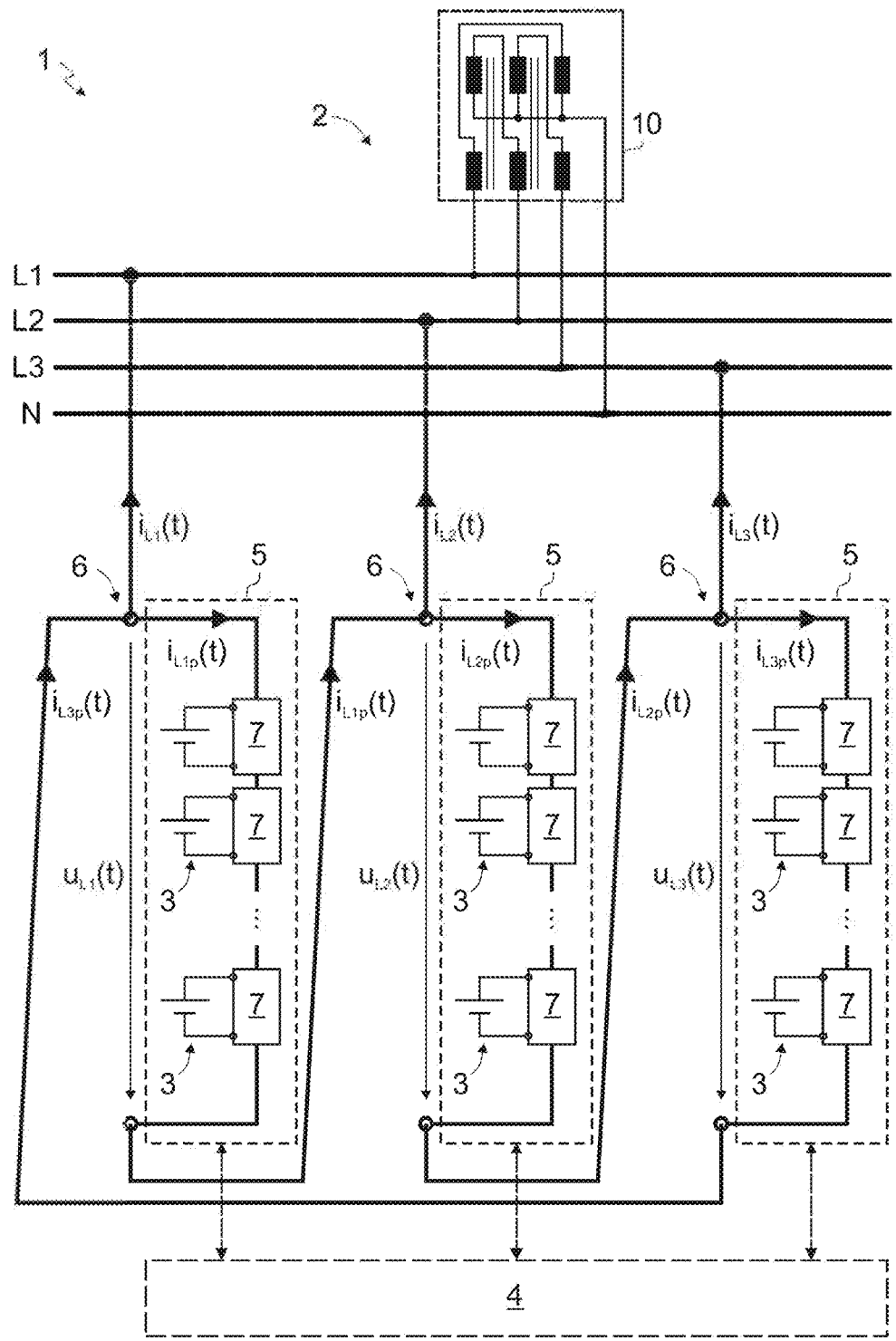
Figure 3:
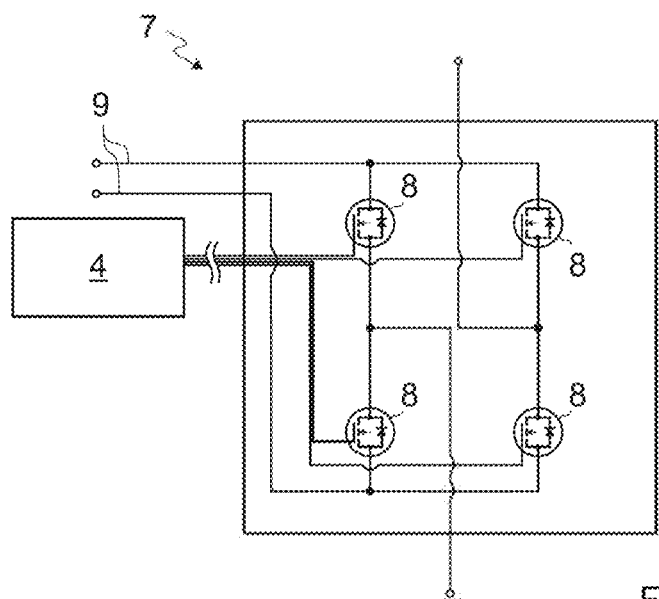
Figure 4:
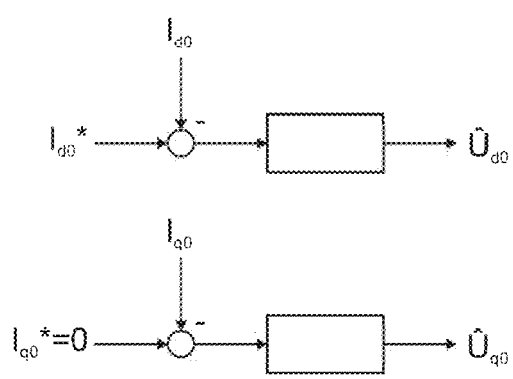
Figure 5:
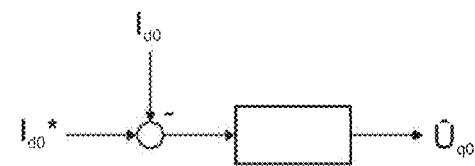
Figure 5:
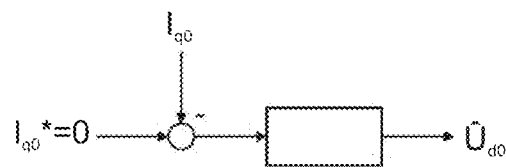
Figure 6:
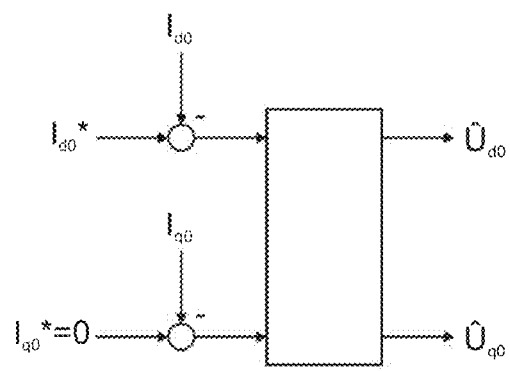

In the figures, in each case schematically:

FIG. 1 shows an energy supply system having a circuit arrangement for generating a three-phase alternating current from three configurable DC voltage strings connected in a delta circuit, with a transformer as a separate neutral grounding transformer, according to a first exemplary embodiment of the invention;

FIG. 2 shows an energy supply system having a circuit arrangement for generating a three-phase alternating current from three configurable DC voltage strings connected in a delta circuit, with a transformer as a separate neutral grounding transformer, according to a second exemplary embodiment of the invention;

FIG. 3 shows an H-bridge circuit of an exemplary inverter unit of a configurable DC voltage string;

FIG. 4 shows a closed-loop control method according to a first variant;

FIG. 5 shows a closed-loop control method according to a second variant;

FIG. 6 shows a closed-loop control method according to a third variant; and

Figure 7:
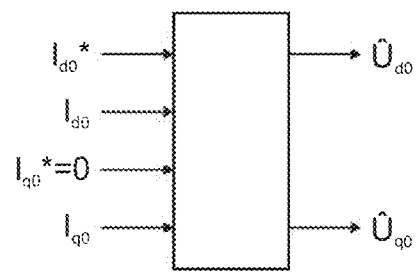

FIG. 7 shows a closed-loop control method according to a fourth variant.

DETAILED DESCRIPTION OF THE ENABLING EMBODIMENTS

FIGS. 1 and 2 show two exemplary embodiments of the proposed energy supply system 1. The energy supply system 1 provides a three-phase alternating current and therefore has three phases L1, L2 and L3 as well as a neutral conductor or neutral point N. The energy supply system 1 may be, for example, part of an electric vehicle (in particular part of an electric car) in order to electrically supply an electrical load of the electric vehicle (in particular an electric motor, more precisely an AC or three-phase motor). In principle, however, it can be any energy supply system 1 for supplying any electrical load with electrical energy, i.e. also a household power supply system, for example.

The energy supply system 1 has a circuit arrangement 2 and a plurality of DC voltage sources 3. In the exemplary embodiment, the DC voltage sources 3 are part of a common energy storage assembly that is not shown in any more detail. The energy storage assembly is preferably a battery or a rechargeable battery pack, wherein the individual DC voltage sources 3 can be designed as battery cells or rechargeable battery cells of the battery or rechargeable battery pack. In particular, the DC voltage sources 3 may be battery cells of a high-voltage storage device of an electric vehicle or a home storage device.

The energy supply system 1 or the circuit arrangement 2 may have one or preferably more open-loop control units for determining status information relating to the battery cells 3. The above-mentioned status information may be in particular information about the current battery cell voltage, the current temperature, the current state of charge or the current "state of health" of the respective battery cell 3. The exemplary embodiments show a single central open-loop control device 4, which, however, should only be understood as an example.

The DC voltage sources 3 or battery cells are divided among three configurable DC voltage strings 5, with the result that there is a configurable series circuit of DC voltage sources 3 or battery cells for each DC voltage string 5. Each DC voltage string 5 is assigned to one of the three phases L1, L2, L3 and has an output-side interface 6, to which a respective AC voltage $u_{L1}(t)$, $u_{L2}(t)$, $u_{L3}(t)$ is applied. The DC voltage strings 5 are arranged in a common delta circuit.

Each of the configurable DC voltage strings 5 has a cascade of a plurality of inverter units 7 which together can provide the respective AC voltage $u_{L1}(t)$, $u_{L2}(t)$, $u_{L3}(t)$ at the output-side interface 6. Each of these inverter units 7 is configured to either include the DC voltage source 3, which can be connected to the respective inverter unit 7, in the generation of the AC voltage $u_{L1}(t)$, $u_{L2}(t)$, $u_{L3}(t)$ or to exclude it from the generation of the AC voltage $u_{L1}(t)$, $u_{L2}(t)$, $u_{L3}(t)$.

The open-loop control device 4 can be accordingly configured to configure the inverter units 7 such that the output-side AC voltage $u_{L1}(t)$, $u_{L2}(t)$, $u_{L3}(t)$ of the DC voltage string 5 corresponds to the desired specifications in terms of amplitude, phase and/or frequency. A symmetrical three-phase alternating current can thus be provided overall by appropriately configuring the interconnection of the individual DC voltage sources 3 of the respective configurable DC voltage strings 5.

It is possible to provide a computer program comprising open-loop control instructions which, when the program is executed by the open-loop control device 4, cause this to carry out a corresponding method for generating the AC voltages $u_{L1}(t)$, $u_{L2}(t)$, $u_{L3}(t)$ or the polyphase alternating current by suitably interconnecting the DC voltage sources 3 or battery cells.

A possible structure of a single inverter unit 7 is shown in FIG. 3 as an example. The inverter units 7 may in particular each have an H-bridge circuit comprising four power electronic switching elements 8 which can be configured by the open-loop control device 4. The open-loop control device 4 is also indicated in FIG. 3 as an example. The power electronic switching elements 8 may be designed in particular as semiconductor components, for example as MOSFETs as indicated in FIG. 3. The open-loop control device 4 can be designed to control the switching elements 8. The inverter unit 7 can finally be connected to the assigned DC voltage source 3 via corresponding supply lines 9. A person skilled in the art is aware of corresponding H-bridge circuits, which is why further details shall not be discussed in any more detail.

The circuit arrangement 2 or the energy supply system 1 also has a neutral grounding transformer 10 for achieving the common neutral point N of all configurable DC voltage strings 5. A (small) transformer with a star-delta circuit (cf. FIG. 1) or a zigzag circuit (cf. FIG. 2) can be advantageously used for this purpose. It may be sufficient to design the neutral grounding transformer 10, i.e. for example the transformer, for a maximum load that is less than 10 kW, preferably less than 8 KW, particularly preferably less than 5 kW.

It is provided that the open-loop control device 4 configures the DC voltage strings 5 such that, on the one hand, the charges of the DC voltage sources 3 of the same DC voltage string 5 are equalized as far as possible and that, in addition, a zero phase-sequence system current $\underline{I}_0 = \underline{I}_{d0} + \underline{I}_{q0}$ with the desired RMS value $I_0$ and phase angle $\varphi_{I0}$ between the DC voltage strings 5 of the different phases L1, L2, L3 is formed in order to also enable cross-phase charge equalization. This zero phase-sequence system current is identical in terms of amplitude and phase position in each configurable DC voltage string 5 and can result from a zero phase-sequence system voltage according to $u_0(t) = \hat{U}_0 \cdot \cos(2 \cdot \pi \cdot f \cdot t + \varphi_0)$ with amplitude $\hat{U}_0$ and phase angle $\varphi_0$. The zero phase-sequence system voltage can be set by appropriately interconnecting the DC voltage sources 3, in addition to the individual AC voltages $u_{L1}(t)$, $u_{L2}(t)$, $u_{L3}(t)$. The following relationships can be provided in this case:

$$u_{L1}(t) = \hat{U} \cdot \cos(2 \cdot \pi \cdot f \cdot t) + \hat{U}_{d0} \cdot \cos(2 \cdot \pi \cdot f \cdot t) + \hat{U}_{q0} \cdot \sin(2 \cdot \pi \cdot f \cdot t),$$

$$u_{L2}(t) = \hat{U} \cdot \cos(2 \cdot \pi \cdot f \cdot t - 120°) + \hat{U}_{d0} \cdot \cos(2 \cdot \pi \cdot f \cdot t) + \hat{U}_{q0} \cdot \sin(2 \cdot \pi \cdot f \cdot t)$$

and $$u_{L3}(t) = \hat{U} \cdot \cos(2 \cdot \pi \cdot f \cdot t - 240°) + \hat{U}_{d0} \cdot \cos(2 \cdot \pi \cdot f \cdot t) + \hat{U}_{q0} \cdot \sin(2 \cdot \pi \cdot f \cdot t),$$

with $\hat{U}_{d0}$ as the d component and $\hat{U}_{q0}$ as the q component of the zero phase-sequence system voltage.

Thus, the following can apply to the alternating currents of the individual phases L1, L2, L3:

$$i_{L1p}(t) = I \cdot \cos(2 \cdot \pi \cdot f \cdot t + \varphi_I) + I_{d0} \cdot \cos(2 \cdot \pi \cdot f \cdot t) + I_{q0} \cdot \sin(2 \cdot \pi \cdot f \cdot t),$$

$$i_{L2p}(t) = I \cdot \cos(2 \cdot \pi \cdot f \cdot t + \varphi_I - 120°) + I_{d0} \cdot \cos(2 \cdot \pi \cdot f \cdot t) + I_{q0} \cdot \sin(2 \cdot \pi \cdot f \cdot t)$$

and $$i_{L3p}(t) = I \cdot \cos(2 \cdot \pi \cdot f \cdot t + \varphi_I - 240°) + I_{d0} \cdot \cos(2 \cdot \pi \cdot f \cdot t) + I_{q0} \cdot \sin(2 \cdot \pi \cdot f \cdot t),$$

with the d component $\underline{I}_{d0}$ and the q component $\underline{I}_{q0}$ of the zero phase-sequence system current, as well as/as the amplitude and $\varphi_I$ as the phase angle of the positive phase-sequence system current of phases L1, L2, L3.

Preferably, the charge equalization can be realized by one of the following two variants:
a) The phase with the lowest charge receives charge from the other two phases. In this case, the power of the phase with the lowest charge in the load reference arrow system is positive—that is to say, active power is consumed by this phase. The current component $I_{d0}$ is positive; or b) the phase with the highest charge supplies charge to the other two phases. In this case, the power of the phase with the highest charge in the load reference arrow system is negative—that is to say, active power is supplied by this phase. The current component $I_{d0}$ is negative.

One or more closed-loop control methods can be used to determine the zero phase-sequence system current, wherein the zero phase-sequence system voltage is used as the manipulated variable, a target value of the zero phase-sequence system current is used as the reference variable and the captured actual value of the zero phase-sequence system current is used as the closed-loop control variable. Closed-loop control can be implemented, for example, as shown in FIG. 4 or 5. In the figures, $I_{d0}*$ corresponds to the target value for the d current component $I_{d0}$ and $I_{q0}*$ corresponds to the target value for the q current component $I_{q0}$.

The q component $I_{q0}$ of the zero phase-sequence system current should preferably be controlled to zero in a closed-loop manner in order to avoid reactive power losses. A target value of a d component of the zero phase-sequence system current can also be determined taking into account a charge difference between the DC voltage sources 3 of the DC voltage strings 5, preferably according to a proportional relationship to the charge difference.

The closed-loop control structure to be used can preferably be selected depending on the ratio between resistance and reactance of the phase L1, L2, L3. If the resistance R is greater than or equal to the reactance X, the closed-loop control according to FIG. 4 may be more advantageous. Conversely, the closed-loop control according to FIG. 5 may be more advantageous if the reactance X is greater than the resistance R. In a battery storage device, the resistance R is (much) greater than the reactance X due to the high ohmic internal resistances of the battery cells 3, with the result that R/X>1 and the closed-loop control according to FIG. 4 is preferred.

However, further alternatives for the closed-loop control are also possible, such as the status closed-loop control according to FIG. 6 or closed-loop control as indicated in FIG. 7.

What is claimed is:

1. A method for generating a polyphase alternating current, in particular a three-phase alternating current, by interconnecting a plurality of DC voltage sources, having at least the following method steps:
   providing a configurable DC voltage string for each phase (L1, L2, L3) of the polyphase alternating current, wherein each configurable DC voltage string is formed from a plurality of the DC voltage sources which can be interconnected in a configurable series circuit;
   arranging the configurable DC voltage strings in a polygon circuit, in particular in a delta circuit;
   providing a neutral grounding transformer for the purpose of achieving a common neutral point (N) of all configurable DC voltage strings; and
   configuring the configurable DC voltage strings such that the polyphase alternating current is provided and a zero phase-sequence system current is also formed for charge equalization between the configurable DC voltage strings,
   wherein a q component of the zero phase-sequence system current is minimized and/or a target value of a d component of the zero phase-sequence system current is determined taking into account a charge difference between the DC voltage sources of the DC voltage strings.

2. The method according to claim 1, wherein a symmetrical three-phase alternating current is provided by appropriately configuring the interconnection of the individual DC voltage sources of the respective configurable DC voltage strings, wherein the following relationships apply to the AC voltages of the individual phases:

$$u_{L1}(t) = \hat{U} \cdot \cos(2 \cdot \pi \cdot f \cdot t)$$
$$u_{L2}(t) = \hat{U} \cdot \cos(2 \cdot \pi \cdot f \cdot t - 120°)$$
$$u_{L3}(t) = \hat{U} \cdot \cos(2 \cdot \pi \cdot f \cdot t - 240°)$$

with the peak value $\hat{U}$ and the network frequency f.

3. The method according to claim 1, wherein the zero phase-sequence system current in each of the configurable DC voltage strings is identical in terms of amplitude and phase.

4. The method according to any claim 1, wherein by appropriately configuring the interconnection of the individual DC voltage sources of the respective configurable DC voltage strings for the formation of the zero phase-sequence system current, a zero phase-sequence system voltage according to $$u_0(t) = \hat{U}_0 \cdot \cos(2 \cdot \pi \cdot f \cdot t + \varphi_0)$$

is added to the AC voltages ($u_{L1}(t)$, $u_{L2}(t)$, $u_{L3}(t)$) of the individual phases (L1, L2, L3), with the amplitude $\hat{U}_0$ and the phase angle $\varphi_0$ of the zero phase-sequence system voltage.

5. The method according to claim 4, wherein one or more closed-loop control methods are used to determine the zero phase-sequence system current, wherein the zero phase-sequence system voltage is used as the manipulated variable, a target value of the zero phase-sequence system current is used as the reference variable and the captured actual value of the zero phase-sequence system current is used as the closed-loop control variable.

6. The method according to claim 1, wherein the q component of the zero phase-sequence system current is controlled to zero in a closed-loop manner.

7. The method according to claim 1, wherein the target value of the d component of the zero phase-sequence system current is determined according to a proportional relationship to the charge difference between the DC voltage sources of the DC voltage strings.

8. A computer program comprising control instructions which, when the program is executed by an open-loop control device, cause this to carry out the method according to claim 1.

9. A circuit arrangement for generating a polyphase alternating current, in particular a three-phase alternating current, from a plurality of DC voltage sources, having
   a configurable DC voltage string for each phase (L1, L2, L3) of the polyphase alternating current, wherein each configurable DC voltage string is configured to interconnect a plurality of DC voltage sources, which can be connected to the configurable DC voltage string, in a configurable series circuit, and wherein the configurable DC voltage strings are arranged in a polygon circuit, in particular in a delta circuit;

a neutral grounding transformer for achieving a common neutral point (N) of all configurable DC voltage strings;

an open-loop control device which is configured to configure the configurable DC voltage strings such that the polyphase alternating current is provided and a zero phase-sequence system current is also formed for charge equalization between the configurable DC voltage strings; and wherein the open-loop control device is configured to minimize a q component of the zero phase-sequence system current and/or to determine a target value of a d component of the zero phase-sequence system current taking into account a charge difference between the DC voltage sources of the DC voltage strings.

10. The circuit arrangement according to claim 9, wherein each of the configurable DC voltage strings has an output-side interface for providing the generated AC voltage ($u_{L1}(t)$, $u_{L2}(t)$, $u_{L3}(t)$), and a cascade of a plurality of inverter units which together can provide the AC voltage ($u_{L1}(t)$, $u_{L2}(t)$, $u_{L3}(t)$) at the output-side interface, wherein each of the inverter units is configured to include at least one DC voltage source, which can be connected to the respective inverter unit, in the generation of the AC voltage ($u_{L1}(t)$, $u_{L2}(t)$, $u_{L3}(t)$) or to exclude it from the generation of the AC voltage ($u_{L1}(t)$, $u_{L2}(t)$, $u_{L3}(t)$).

11. The circuit arrangement according to claim 10, wherein the inverter units each have an H-bridge circuit consisting of four configurable power electronic switching elements.

12. The circuit arrangement according to claim 9, wherein the neutral grounding transformer has a transformer with a star-delta or zigzag circuit.

13. The circuit arrangement according to claim 9, wherein the neutral grounding transformer is designed for a maximum load that is less than 10 kW.

14. An energy supply system having a circuit arrangement according to claim 9 and the DC voltage sources, wherein the DC voltage sources are connected to the corresponding configurable DC voltage strings.

15. The energy supply system according to claim 14, wherein the DC voltage sources are designed as battery cells of a battery.

* * * * *